United States Patent
Ashmore (10) Patent No.: US 8,373,882 B2
(45) Date of Patent: Feb. 12, 2013

(54) MOBILE DOCUMENT IMAGING AND TRANSMISSION

(75) Inventor: Allan Ashmore, North Grafton, MA (US)

(73) Assignee: Dialogic Corporation, Montreal, Quebec (CA)

( * ) Notice: Subject to any disclaimer, the term of this patent is extended or adjusted under 35 U.S.C. 154(b) by 569 days.

(21) Appl. No.: 12/496,817

(22) Filed: Jul. 2, 2009

(65) Prior Publication Data

US 2011/0002005 A1 Jan. 6, 2011

(51) Int. Cl.
*G06F 15/00* (2006.01)
*H04L 12/66* (2006.01)

(52) U.S. Cl. ........................ 358/1.15; 370/352
(58) Field of Classification Search ............ 358/1.15
See application file for complete search history.

(56) References Cited

U.S. PATENT DOCUMENTS

| | | | | |
|---|---|---|---|---|
| 8,037,138 B2 * | 10/2011 | Izumi | ........ | 709/206 |
| 2006/0135202 A1 * | 6/2006 | Ho et al. | ........ | 455/556.2 |
| 2008/0019492 A1 * | 1/2008 | Jyoti | ........ | 379/100.01 |

OTHER PUBLICATIONS

"Scan, copy, and fax with your camera phone," www.scanr.com, Apr. 16, 2009.
"Open Text eDocs Mobility," www.opentext.com, Apr. 16, 2009.
"PrinterOn Extends Its Mobile Printing Application for BlackBerry," www.blackberry.com, Apr. 16, 2009.

* cited by examiner

*Primary Examiner* — Saeid Ebrahimi Dehkordy
(74) *Attorney, Agent, or Firm* — Preti Flaherty Beliveau & Pachios LLP (57) ABSTRACT

A wireless communication device can send and receive real-time facsimile transmissions over a data channel available to the device. The device can implement a real time facsimile protocol over the data channel, which can generally be a packet switched network connection, such as an IP connection. An image capture device can be employed to obtain an image of a document that can be facsimile transmitted from the wireless device over the data channel. The document image may be converted to a format generally usable with facsimile transmissions. The wireless device can be configured to transmit immediately following image capture, or after a desired number of images are captured. A contact list that may be included with the wireless device may be used to select a destination address for facsimile transmission. A printing device can be the destination address to permit wireless or mobile printing.

24 Claims, 3 Drawing Sheets

MOBILE DOCUMENT IMAGING AND TRANSMISSION

STATEMENT REGARDING FEDERALLY SPONSORED RESEARCH OR DEVELOPMENT (Not Applicable)

BACKGROUND OF THE INVENTION

The present disclosure relates generally to mobile document imaging and transmission, and relates more particularly to mobile document imaging and transmission via facsimile.

Facsimile document transmission continues to have an important role in business communications for a number of reasons including the ability to transfer images not stored on local computer, legal acceptance of handwritten signatures, real-time confirmation of receipt, confidence in what has been received, and a 'tamper resistant' copy of the information transferred. Facsimile machines are generally ubiquitous on a global scale to easily take advantage of existent telecommunications networks. Facsimile machines may also be shared by a number of individuals so that sending and receiving documents can be relatively efficient among a general population or group of persons.

As used herein, the term ""document"" is used to encompass a construct that conveys information that can be represented in the form of readable characters, symbols or graphics, whether text, images or formatting, in electronic, paper, or other tangible form. Thus, the term ""document"" includes images or portions of images derived from paper or hard copy scans or image capture operations, and can be abbreviated, truncated, condensed, expanded or appended to before, during or after transmission/reception. The term ""document"" also encompasses information that represents readable characters, symbols or graphics in electronic form that have no original paper counterpart.

Documents are often transformed into other representations such as by printing, scanning or transmission. In the case of document transmission, transformation of the document often occurs as part of the transmission process, such as with transmission by facsimile or email. In such facsimile transmissions, the document may be transformed to an image representation suitable or desirable for facsimile transmissions, such as a TIFF format. An image document generally refers to a representation of information suitable for display or transmission that is usually viewed as an electronic image or picture. A text document generally refers to a representation of information with text characters, such as a document that includes ASCII type characters.

Mobile phones and other wireless devices such as wireless personal digital assistants (PDAs) and handsets or headsets are available that provide wireless communications with a number of different channels. Mobile phones, for example, are offered with voice channel communications, which are typically tailored to carrying voice data in terms of frequency spectrum and signal compression. Wireless communication devices may also include a signal channel, typically used for call set up and tear down, as well as call control functions. In addition, many wireless communication devices offer a data channel, sometimes referred to as mobile networking. These types of data channels may theoretically permit data rates in a range of from about 7.2 megabits per second (mbps) up to about 14.4 mbps on a downlink side and about 5.8 mbps on an uplink side. Data rates are typically reduced for wireless devices that are in motion. The data channel communications standard is described by the International Telecommunication Union (ITU) Standard IMT-2000 (International Mobile Telecommunications-2000). The defined standards include code division multiple access (CDMA) and time division CDMA (TD-CDMA).

The data channel available on wireless communication devices permits a wide range of capabilities for telephony and messaging, including telephone conversation, teleconferencing, instant messaging, email, web browsing, scheduling and document viewing and editing. Service carriers support these types of data rich applications with high data bandwidth availability for the data channel. The data channel for wireless communication devices is sometimes referred to presently as 3G (third generation) wireless communications.

Another feature often provided with wireless communication devices is a high resolution imaging device, such as a digital camera or digital video recorder. Depending upon the manufacturer, the digital image devices range anywhere from 1-10+ megapixels in resolution. In general, 2+ megapixels can provide a nominal resolution that is suitable for imaging. An application often used with wireless communication devices having a digital imaging device is the capture of an image, such as a photograph, that can be sent over the above-described data channel.

The facility of a digital camera coupled with a wireless communication device has been used to send images of documents that are captured using the digital imaging device. According to one known implementation, a digital image of a document is captured using the digital image device, and sent to a centralized data server using the data channel of the wireless communication device. The centralized server offers a service whereby the document image is used to reconstruct a document suitable for word processing, printing or email or facsimile transmission. Other applications are known where documents may be received over a data channel at a wireless communication device and edited and forwarded to a recipient. Applications are also available that permit printing of a document from a wireless communication device. For example, wireless communication devices are often equipped with interoperative wireless local area network (LAN) capability, which is often referred to as WI-FI®. WI-FI type communications can be used to wirelessly connect to a local area network with relatively high bandwidth. The document on the wireless communication device can be sent through a WI-FI type channel to a local area network or properly equipped printer to permit the document to be printed. In addition, applications exist that permit the user to send a formatted document to a centralized server, using WI-FI type communications or a data channel, for transmission to a facsimile device, such as a local facsimile machine. With such a facility, a user can print a formatted document at a local facsimile machine, or at a properly configured printer.

SUMMARY

The present disclosure provides systems and methods for directly sending facsimile transmissions from a mobile communication device using a data channel. In accordance with an exemplary embodiment of the present disclosure, a mobile or wireless communication device has an image capture device for obtaining digital images and a facsimile transmission engine for sending and receiving facsimile images over a data channel. The facsimile transmission engine implements a real time protocol (RTP) for facsimile transmission over an Internet Protocol (IP). For example, a protocol such as the T.38 standard to implement facsimile over Internet Protocol (FoIP) may be used. The facsimile transmission engine can be connected to a FoIP gateway using the data channel to permit facsimile transmissions to facsimile machines through the FoIP gateway.

An exemplary embodiment of the present disclosure provides a system and method where a user can obtain an image of a document using a digital imaging device on a wireless communication device, such as a camera on a mobile phone. The digital image can be converted to a format suitable for facsimile transmission. Hardware or software in or attached to the wireless communication device provides a facsimile transmission image for sending the formatted image. The formatted image is transmitted to a FoIP gateway for transfer to an IP address destination or a facsimile machine, such as via transmission through a circuit switched network or PSTN. The FoIP gateway can translate the facsimile transmission from the wireless communication device to a suitable format for the destination facsimile machine, whether analog or digital, or utilizing PSTN or IP communication networks.

The user may also receive facsimile transmissions in real time using the facsimile transmission engine implemented with the wireless communication device. According to some embodiments, the wireless communication device need not be connected to a communication network at the time of transmission to receive a facsimile. For example, if the wireless communication device is powered off, or not within range of a wireless communication network node, the facsimile transmission can be stored in a gateway or server in accordance with the store and forward transmission method discussed above. In such an instance, the user can receive the facsimile transmission when the wireless communication device becomes powered and/or connected to an IP network, for example.

A number of applications are available using the disclosed systems and methods, including mobile printing and document management. The user may take advantage of listings in a contact list in the wireless communication device to send facsimile transmissions. Various software or hardware may be employed with the wireless communication device to enhance the facsimile transmission implementation. For example, imaging software may be implemented to digitally enhance the image prior to facsimile transmission.

BRIEF DESCRIPTION OF THE SEVERAL
VIEWS OF THE DRAWINGS

The present disclosure is described in greater detail below, with reference to the accompanying drawings, in which.

DETAILED DESCRIPTION OF THE INVENTION

The present disclosure provides systems and methods for directly sending and/or receiving facsimile transmissions from/to a mobile communication device using a data channel. The facsimile transmission may involve a document obtained from an arbitrary source, such as email, facsimile, a local word processor, a local network or any other type of source for obtaining a document on the mobile communication device. The mobile or wireless communication device may have an image capture device for obtaining digital images that for the document, and may have a facsimile transmission engine for sending and receiving facsimile images over the data channel. The facsimile transmission engine implements a real time protocol (RTP) for facsimile transmission over an Internet Protocol (IP). For example, a protocol such as the T.38 standard to implement facsimile over Internet Protocol (FoIP) may be used. The facsimile transmission engine can be connected to a FoIP gateway using the data channel to permit facsimile transmissions to facsimile machines through the FoIP gateway.

Figure 1:
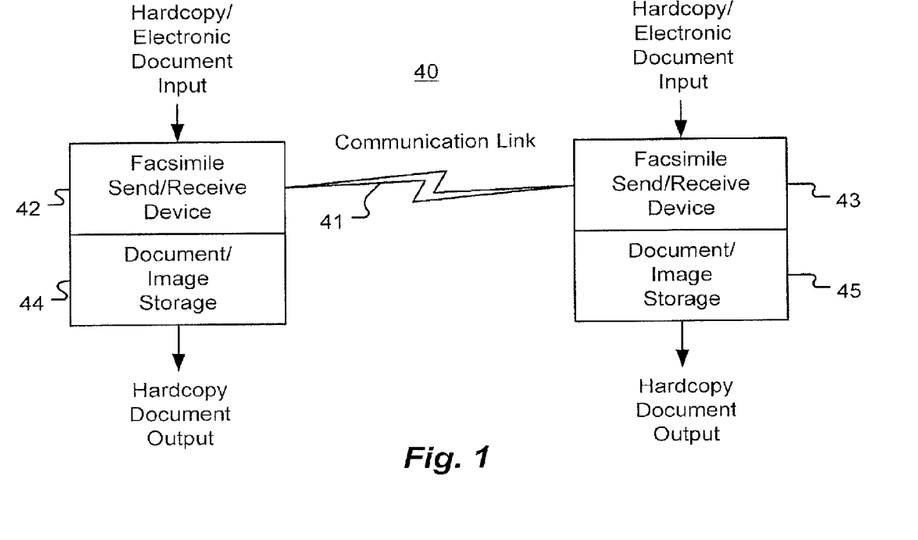
FIG. 1 is a block diagram illustrating facsimile communication.

Referring now to FIG. 1, a diagram of a facsimile communication system 40 is illustrated. System 40 includes two complimentary facsimile devices 42, 43 for sending and receiving facsimile documents over a communication link 41. Communication link 41 may be formed through any typical physical media used for communication, including radio wave, microwave, or other RF media, fiber optic, traditional telephone lines or combinations of any different types of media for communication. Devices 42, 43 may also form components in a traditional telephone network, a local area network (LAN) or a wide area network (WAN), so that they can send or receive facsimile documents within a network of electronic devices. For example, device 42 as part of a LAN, may receive instructions from an electronic device within the LAN to transmit an electronic form document from the electronic device to facsimile device 43, or to an electronic device coupled to facsimile device 43.

Devices 42, 43 may communicate with a number of types of protocols that may depend upon characteristics of the communication link, such as the physical media used or the connectivity for the communication link. A common example of a communication link that may have many different types of physical media is a switched network. Switched networks may take the form of a circuit switched network, such as the Public Switched Telephone Network (PSTN), or a packet switched network, such as an Internet Protocol (IP) network. A switched network may have a number or different types of physical media that the user, or devices 42, 43, may take advantage of, such as radio wave antennas, microwave repeaters, fiber optic cables, coaxial cabling, twisted pair(s) and so forth. Devices 42, 43 typically have protocols for connecting to the network through the available physical media. In addition to the physical media protocol, devices 42, 43 have a transport or communication protocol for establishing a communication link and sending or receiving information over the communication link. Various protocols available for devices 42, 43 may take advantage of analog telephone lines, digital telephone lines and switching networks such as PSTN or IP networks. For example, devices 42, 43 may communicate over an analog telephone line and conform to group 2 or group 3 communication standards including International Telecommunication Union, Telecommunication Standardization Sector (ITU-T) recommendations T.30, T.3 or T.4. In the case of digital telephone lines, devices 42, 43 may communicate with group 4 standards, such as ITU-T recommendations T.6, T.62, T.503, T.563 or T.611, among others.

In the case of a packet switched network such as an IP network, facsimile devices 42, 43 may communicate on a real-time or store-and-forward basis. A real-time basis typically takes advantage of voice over IP (VoIP) to send an audio stream over an IP network. VoIP protocols such as SIP (Session Initiation Protocol), IAX (Inter-Asterisk Exchange) and H.323 based on ITU-T recommendations may be used. In this type of environment, a codec typically converts the audio stream to a digital form for VoIP. One such protocol that provides for real-time Facsimile over IP (FoIP) is the ITU-T T.38 standard for real-time mode messages based on a User Datagram Protocol (UDP) or Transmission Control Protocol (TCP). The real-time mode T.38 IP based facsimile service or protocol maps the T.30 facsimile protocol onto an IP network. The T.38 service uses two protocols, one for UDP packets and another one for TCP packets. The T.38 service supports VoIP call control protocols such as SIP, IAX and H.323 for transmitting a facsimile data stream over a packet switched network.

In a store-and-forward mode, devices 42, 43 communicate through FoIP gateways that store and forward facsimile data. Each FoIP gateway stores an image of the transmitted facsimile data and sends the data using Simple Mail Transfer Protocol (SMTP) or other transport mechanisms to another FoIP gateway where the image is decoded and available for a receiver. This type of mode is similar to that used by electronic mail ("email") messages.

For real-time facsimile transmissions, facsimile devices 42, 43 typically establish a communication channel over communication link 41 with recognized communication protocols to exchange information for facsimile communication. For example, facsimile device 42 may initiate a call over a packet switched network, such as an IP network, by initiating a session with SIP support, as discussed above, to establish a communication link with facsimile device 43. The session initiation may include invitations and acknowledgements for participation in the call over a packet switched network. Typically, the session initiation involves a proxy server that transmits IP messages between the sender and receiver with SIP support. Various messages may be transferred between sender and receiver during the session initiation. For example, facsimile device 42 may query facsimile device 43 for parameters of transmission, such as operating speed, capacity, type of transmission protocol in use, and so forth. Facsimile device 43 may provide facsimile communication information to facsimile device 42, as well as pose information queries for parameters related to facsimile transmission. One or more proxy servers may store some or all of the parameter information. Typically, once facsimile devices 42, 43 have negotiated common parameters and protocols, transmission of the facsimile information commences.

Figure 2:
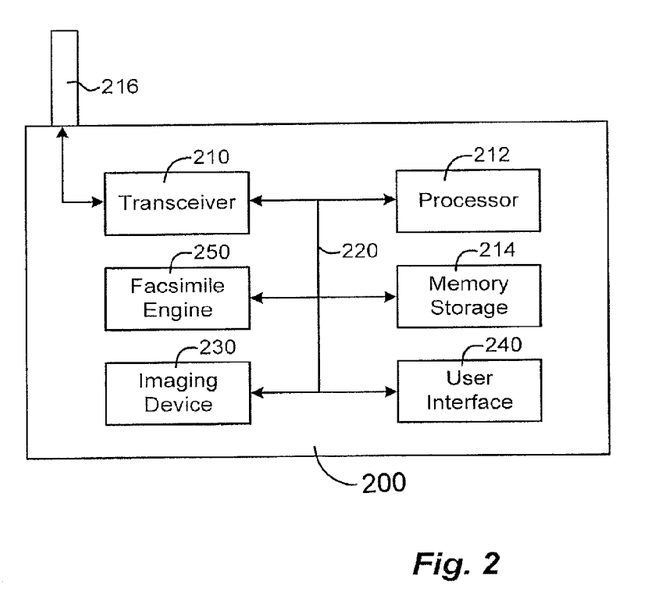
FIG. 2 is a schematic block diagram of a wireless communication device.

Referring to FIG. 2, a conceptual block diagram of a wireless communication device 200 is illustrated. Device 200 may be implemented as facsimile device 42 or 43, where communication link 41 includes a wireless communication link (not shown). Device 200 includes a transceiver 210, a processor 212 and a memory storage 214. Transceiver 210 operates with a signal receiving/transmitting device 216, which may be, for example, an RF antenna, to send and receive information through a wireless network connection. Processor 212 provides control and processing for operation of device 200, such as by controlling transceiver 210 to send and receive information using antenna 216. Memory storage 214 may be used to store data for different components of device 200, as well as processing or control instructions for processor 212 or other components of device 200. Device 200 also includes a bus 220 that is used to transfer data and/or control information between the different components. Bus 220, as well as the other components of device 200, are shown conceptually in FIG. 2 for explanatory purposes. It should be apparent that other physical connections and arrangements of the components of device 200 may be implemented in addition to and/or in lieu of what is depicted and described.

Wireless communication device 200 also includes an imaging device 230 and a user interface 240. User interface 240 may implemented to permit user input and output, such as via the pressing or keying of buttons, via the touching of a screen, via stylus input, via thumbwheel, via voice instructions, and/or via any other type of available user input. User interface 240 may provide output to a user in the form of audio, image, and/or tactile media, such as may be the case with voice communications, display information and/or vibrational outputs. In general, user interface 240 permits or facilitates interactive operations between a user and device 200.

Imaging device 230 is typically implemented as a CCD type digital imaging camera that can record incident images, typically to produce digital data files that can be stored in memory storage 214, for example. The resolution of imaging device 230 is typically on the order of 1-10+ megapixels. For the purposes of the present disclosure, the resolution of imaging device 230 is preferably 2+ megapixels for nominal imaging resolution.

Device 200 also includes facsimile engine 250 in accordance with the present disclosure. Facsimile engine 250 is illustrated conceptually in FIG. 2, in that it can be implemented in hardware with a physical device, or can be implemented in software, such as by a sequence of program instructions executable by processor 212 in response to various inputs. Device 200 may receive a message from transceiver 210 that a facsimile is available for reception. The input message is indicated to processor 212, which then executes a series of program instructions drawn from memory storage 214 to receive the facsimile transmission from transceiver 210, and stores the resulting facsimile data in memory storage 214. Similar operations may be implemented using processor 212 and program instructions from memory storage 214 to send a facsimile transmission to a remote destination through transceiver 210. Facsimile engine 250 thus represents a mechanism for sending and receiving facsimile transmissions based on inputs received from user interface 240, imaging device 230, transceiver 210 or processor 212. In accordance with an exemplary embodiment of the present disclosure, facsimile engine 250 uses an IP facsimile transmission protocol in accordance with the T.38 standard for FoIP.

Figure 3:
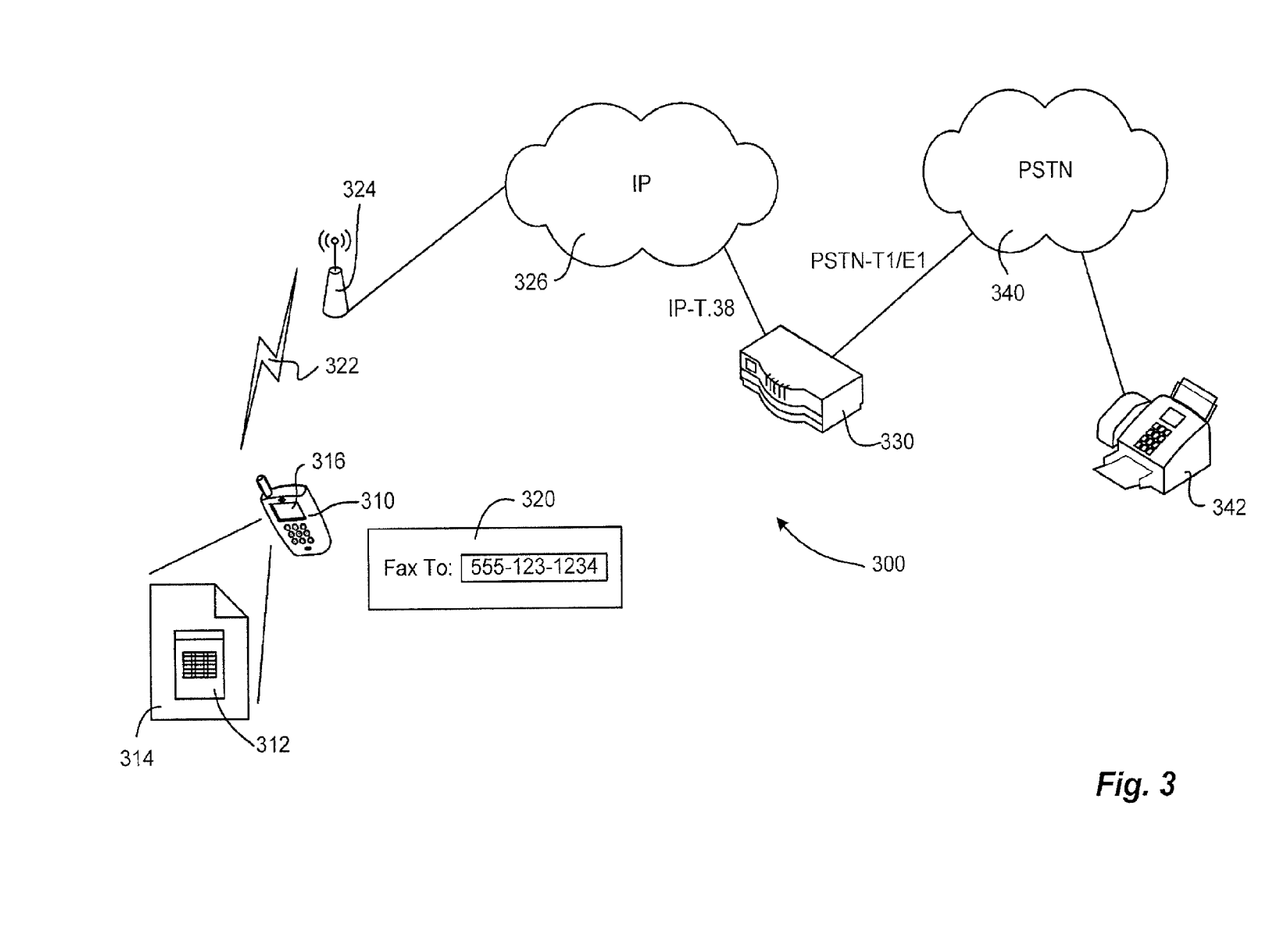
FIG. 3 is a schematic block diagram of a communication network employing the present invention.

Referring now to FIG. 3, a block diagram for a communication system 300 in accordance with an exemplary embodiment of the present disclosure is illustrated. System 300 illustrates the different components of a facsimile transmission system using a mobile or wireless communication device, such as a mobile phone 310. In this exemplary embodiment, mobile phone 310 may include or be equipped with a digital imaging device (not shown) such as a camera. Other embodiments in which an imaging device is used in accordance with the present disclosure are possible, for example if a separate imaging device such as a camera or scanner is used to capture a document image, which document image is then transferred to mobile phone 310 by any typical known data transfer technique. For example, a WI-FI network may connect an imaging device such as a camera or scanner with mobile phone 310 to permit transfers of document images from the imaging device to mobile phone 310. Alternately, or in addition, a removable or directly connected media storage devices may be used to transfer data, such as a flash memory device, an SD card, a PC connected cradle, or any other type of connection between an imaging device and mobile phone 310 capable of transferring data. Accordingly, the imaging device need not be integrated into mobile phone 310, although such an exemplary embodiment of the present disclosure is illustrated an described herein with reference to FIG. 3.

In accordance with the embodiment illustrated in FIG. 3, a user positions mobile phone 310 to capture an image 314 of a document 312 using the on-board camera. A user can capture an image 314 of document 312 through user input, such as with the press of a button and/or another user input technique (such as those described above with respect to user interface 240 shown in FIG. 2). Image 314 may be provided on a display 316 of mobile phone 310 prior to image capture to help the user position mobile phone 310 to obtain a desired image capture. Image 314 can be captured and stored in a memory storage, such as memory storage 214 (FIG. 2) on board mobile phone 310 for conversion and facsimile transmission over a wireless data channel.

Mobile phone 310 may be provided with a representation of a document for facsimile transmission through facilities other than an image capture operation. For example, a document representation may be provided as a text document stored in mobile phone 310, which text document is converted to an image or other representation suitable for realtime facsimile transmission from mobile phone 310 in accordance with the present disclosure. The document representation may be provided, for example, with a file transfer such as FTP, or in the form of an email message including an attachment, such as a file attachment that may be in the form of an image document, such as a PDF, TIFF, JPEG, BMP or other image file type, as well as file attachments that may be in text or word processing based formats, such as TXT, DOC or other generally text based file types. In general, any type of document representation provisioning may be used in accordance with the present disclosure, as long as the wireless communication device, such as mobile phone 310, has access to the data representing the document. For example, the data transfer techniques discusses above may be used, as well as or in conjunction with email messaging through a wireless data channel or through a direct connection to mobile phone 310, such as may be provided with a link to a personal computer, such as a connection with a USB port. In any event, mobile phone 310 is provided with a document representation that can be facsimile transmitted using the data channel with a realtime facsimile protocol.

The user may input a desired destination identifier, or use a contact list feature of mobile phone 310 to choose a desired destination identifier. The destination identifier may be a facsimile number, an IP address, domain name, or any other type of identifier that may be used to direct a facsimile transmission in a communication network that is coupled to mobile phone 310. Any type of destination selection available in mobile phone 310 may be used, including selection of a link, such as a hyperlink, preprogrammed selections, voice identified selections, and any other type of destination selection mechanism available in mobile phone 310. An exemplary destination identifier is shown as a facsimile telephone number illustrated with a selection display 320 in FIG. 3. Upon selection of a destination identifier, such as a facsimile telephone number, the user can provide an input to cause a facsimile transmission to be initiated, such as by sending call setup signals as wireless transmissions over a data channel available with mobile phone 310, as indicated by wireless datalink 322.

Prior to facsimile transmission of document image 314, mobile phone 310 may cause document image 314 to be converted to an image format suitable for facsimile transmission. A camera provided in mobile phone 310 typically has a viewable area for capturing an image that produces a JPEG (joint photographic experts group) data file that is stored in mobile phone 310. The JPEG format file may optionally be converted to a format more suitable for facsimile transmission, such as a TIFF (tagged image file format) file. TIFF file format provides lossless image compression and flexibility of implementation that makes it attractive for use with facsimile transmissions. For example, a TIFF image can more readily be transmitted using facsimile protocol than some other types of image file formats. A facsimile engine implemented in mobile phone 310 can be configured to automatically convert images captured by the onboard camera for facsimile transmission, or can convert an image once the image is selected for facsimile transmission, such as in conjunction with selection of a facsimile destination indicator, as illustrated in selection display 320. Any type of file format or image representation may be used that is suitable for facsimile transmission over wireless data link 322.

Once mobile phone 310 has a suitably formatted image file and an indication of a facsimile destination, the facsimile document can be sent over wireless data link 322 using a facsimile protocol, such as the realtime IP facsimile transmission protocol T.38, often referred to as FoIP. The FoIP transmission over wireless datalink 322 arrives at a network transfer station or node, such as a cell tower 324, where communications equipment can convert and forward the information contained in the radio frequency signal for transmission over communication networks connected to cell tower 324, such as IP network 326.

Network 326 directs the information, which may be in the form of packets, to an IP address associated with gateway 330. Gateway 330 is a T.38 gateway that can convert various communications between differing protocols. An example of a suitable gateway is a gateway from the Dialogic® Media Gateway Series, which is commercially available from Dialogic Corporation of Montreal, Canada. In the exemplary embodiment illustrated in system 300, gateway 330 can convert IP packets under the T.38 protocol to PSTN signaling protocols such as may be implemented using T1 or E1 type communications.

After conversion of the packets to circuit switched signaling protocols, the information embodying the facsimile transmission is provided to a circuit switched network, such as a PSTN 340. PSTN 340 operates in accordance with standard or conventional circuit switched facsimile transmission. A fax machine 342, which is the intended destination for the facsimile transmission, is connected to PSTN 340 in a conventional manner as part of the circuit switched network. Although fax machine 342 is depicted as visually resembling a traditional fax machine, fax machine 342 may be implemented as any device, equipment or object, single or multiple, wired or wireless, that is capable of sending and/or receiving a facsimile transmission, such devices including but not being limited to fax machines, computers, multi-function peripherals and mobile devices.

The signaling protocol provided by gateway 330 targets fax machine 342 through PSTN 340 for delivery of the facsimile transmission. In accordance with the different facsimile transmission protocols for packet switched and circuit switched networks, mobile phone 310 and facsimile machine 342 may exchange messages during call initiation for such purposes as establishing transmission parameters. The exchanged messages pass through gateway 330 as translated between the differing network protocols represented by IP network 326 and PSTN network 340. Once a call is established, facsimile data is transferred from mobile phone 310 to facsimile machine 342 in real time in accordance with the various facsimile protocols in use. Upon completion of the facsimile transmission, the various facsimile protocols provide for an acknowledgement of receipt and termination of the call.

Mobile phone 310 may be used to transmit a single page or image as a facsimile transmission. In such an instance, mobile phone 310 may be configured to permit the facsimile transmission to occur with a reduced amount of user intervention.

For example, a user can identify a facsimile destination for the single page or image transmission, position the image capture devise of mobile phone 310 to capture an image of the document and provide an indication to initiate the facsimile transmission. The indication provided by the user may be a button press, stylus input, or any other kind of input, such as those described above with respect to user interface 240 shown in FIG. 2, that mobile phone 310 can accept. Once the user provides the indication for facsimile transmission, the imaging device in mobile phone 310 captures an image 314 of document 312, optionally converts the captured image to a form suitable for a facsimile transmission, and transmits the document to the selected facsimile destination. According to this configuration of mobile phone 310, a single page facsimile transmission can be sent with a single input from the user to cause image capture and facsimile transmission.

In the event a multiple page document is to be facsimile transmitted using mobile phone 310, a number of images are captured representing the different pages of the document to be facsimile transmitted, with the number of captured images generally, but not necessarily, being equal to the number of different pages of the document to be facsimile transmitted. With such a configuration, mobile phone 310 is positioned to capture a separate image 314 for each page of document 312 to be transmitted. A page image is captured through user intervention, such as through a button press input, and/or via another user input technique such as those described above with respect to the user interface 240 shown in FIG. 2, for each page of the document. Mobile phone 310 can concatenate captured images of document pages to form a single imaged document consisting of a number of imaged pages. Once all the pages of document 312 have been imaged to form an imaged document that is to be facsimile transmitted, the user can provide an indication that a facsimile should be sent, such as with a button press input. Mobile phone 310 may then convert the document image to a form suitable for facsimile transmission, such as a TIFF format document. The document is then facsimile transmitted as described above.

Mobile phone 310 may be configured to facsimile transmit each page that is captured with the image capture device on a page by page basis. For example, in the case of a multi-page document, mobile phone 310 can be configured to permit selection of a facsimile destination, capture images of the pages of the document in accordance with user actions, and directly facsimile transmit each captured page immediately after image capture. In such a configuration, mobile phone 310 can be facsimile transmitting pages of a document that have been captured with the image capture device while the user is continuing with actions to capture subsequent pages of the same document that is being facsimile transmitted.

Figure 4:
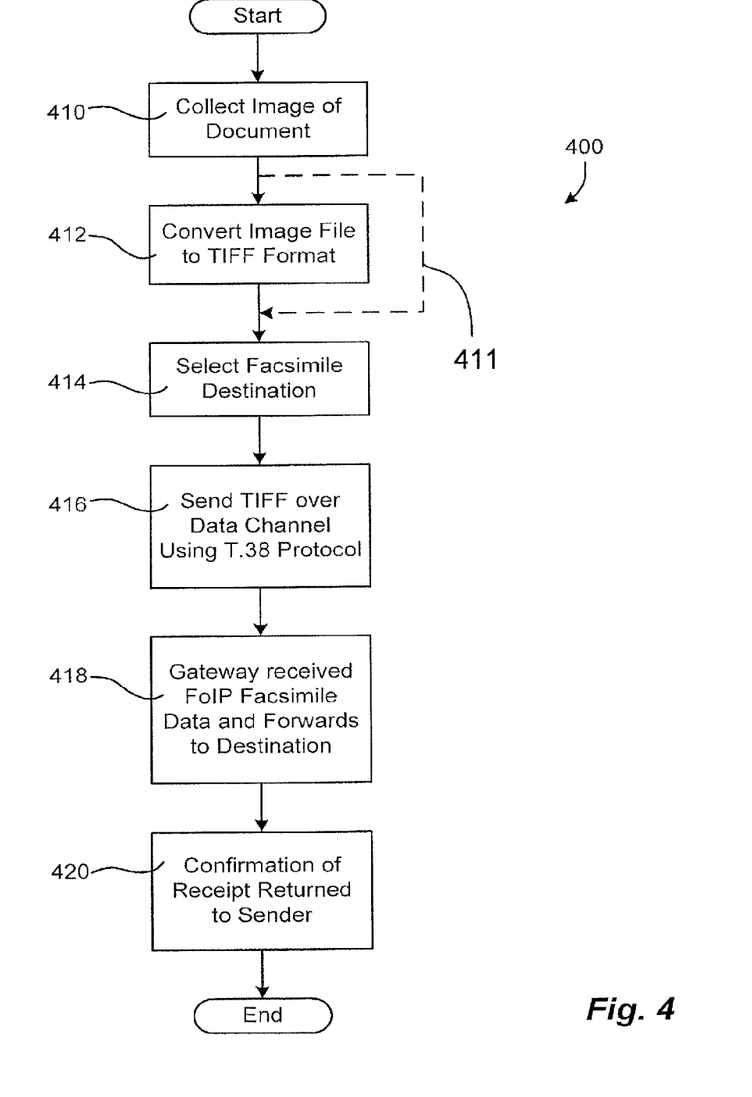
FIG. 4 is a flowchart illustrating a process for facsimile transmission according to an exemplary embodiment of the present disclosure.

Referring now to FIG. 4, a flow chart 400 is illustrated for a process for facsimile transmitting a document in accordance with an embodiment of the disclosed system and method, making reference, at times, to the system 300 of FIG. 3 and its various components. In block 410, an image of a document is obtained, such as by capturing image 314 with an image capture device or by receiving a document or data representative of a document in accordance with any type of available data transfer implementation available to mobile phone 310, as discussed above. Such an activity as indicated in block 410 occurs with a mobile or wireless communication device, and can be the result of image capture within image capturing device obtained with the wireless communication device, or by loading an image into memory in the wireless communication device. In one embodiment, an SD card can be used to provide a document image to the wireless communication device.

In block 412, the document image is converted to a TIFF file for facsimile transmission. The operation(s) in block 412 can be optional, as indicated with dashed line 411, since a number of image file types may be used for facsimile transmission in accordance with the disclosed system and method. For example, JPEG, BMP, GIF, PNG or any other type of image or graphics file format suitable for facsimile transmission may be used.

In block 414, a facsimile destination is selected. The selection of a facsimile destination can occur automatically, such as through a preprogrammed destination address, which can be a conventional telephone number, IP address, or any other communications network address suitable for facsimile reception. The selection may also be provided through user interaction with the communication device, such as with input to mobile phone 310 (FIG. 3). For instance, a user may select a facsimile destination from a contact list available in mobile phone 310. Alternately, or in addition, a user may enter a facsimile destination such as by keying in digits, and/or via another user input technique such as those described above with respect to the user interface 240 shown in FIG. 2. A facsimile destination may also be selected as a result of a receipt of a message, such as an email or text message, which can provide a facsimile destination address. Block 414 is illustrated as following blocks 410 and 412 in flow chart 400, but can be executed at any point in flow chart 400 prior to the actual facsimile transmission, which occurs at Block 416.

Block 416 illustrates a process part for sending a TIFF facsimile document over a data channel available in mobile phone 310, for example, using the T.38 protocol. The TIFF document being sent over the data channel is provided from mobile phone 310 across a wireless link 322 to a cell tower 324, for example, where packets are extracted to packet switched network 326. The packets comprising the facsimile transmission are delivered to gateway 330 as an intermediate destination using the T.38 facsimile transmission protocol for packet switched networks.

In block 418, a gateway that can translate between different network protocols for network communications may receive the packet based facsimile data. For example, gateway 330 may receive the packet data from packet switched network 326 using the appropriate signaling and protocols for the packet transmission. In accordance with the exemplary process in block 418, gateway 330 forwards the facsimile data to circuit switched network 340 after appropriate translation of the facsimile data to circuit based protocols, including T1 or E1. The circuit switched network protocols provide the appropriate destination address obtained from the packet data in the conversion by gateway 330. The destination address identifies a conventional facsimile device, such as facsimile machine 342, to permit delivery of the facsimile data. Block 418, representing an example of a gateway transmission, such as by gateway 330, can be optional, in that packet based facsimile data can be directly transmitted to an IP enabled facsimile machine, without need of translation or forwarding by gateway transmission.

In block 420, receipt of the facsimile data at a destination facsimile device is confirmed with a return message provided to the originating wireless communication device, such as mobile phone 310. The return message is translated through gateway 330 and provided to mobile phone 310 in the form of packet data in accordance with a realtime facsimile transmission protocol, such as the T.38 protocol.

According to an embodiment of the disclosed system and method, a wireless communication device, such as mobile phone 310, directly implements facsimile transmission (sending and/or receiving) using a real time fax protocol such as the T.38 protocol. The facsimile transmission may involve a document represented with document information that is stored on the wireless communication device or that is obtained through an image capture with an image capture device that may be included in the wireless communication device. For a typical image capture device, such as a camera on a cell phone, nominal resolution for facsimile transmission of a single letter or A4 sized page is about 2 megapixels. A typical fine facsimile resolution can in general be obtained with an image capture device having 4 megapixels, for example, which is within the range of presently available commercial devices. The disclosed system and method permit processing of a scanned or captured image using application software to produce a standard intermediate representation for facsimile transmission, such as through a conversion to a TIFF representation. A facsimile engine in the wireless communication device initiates a call using a packet switched protocol such as SIP over the packet switched network through a data channel, such as a 3G link. Through call initiation signaling, a remote FoIP gateway responds to the call signaling to contribute to completing the call for the facsimile transmission. The FoIP gateway may be provided by a wireless communication device carrier, or an enterprise associated with the user or the wireless communication device, for example. The T.38 protocol used in conjunction with the data channel provided with the wireless communication device has relatively low bandwidth specification for facsimile transmission. For example, the bandwidth used in a facsimile transmission involving the T.38 protocol may have a peak around 15 kbps. Typical 3G data channel rates are provided in the range of 300 kbps and greater, so that sufficient bandwidth should be available for facsimile transmission over the data channel.

Inbound facsimile transmissions to the wireless communication device may also be received in accordance with the T.38 facsimile transmission protocol, and may be stored on the wireless communication device, for example. The inbound facsimile transmissions can be stored on the wireless communication device in a standard format, such as TIFF, and can be converted to other file types or forms for use with a variety of applications. As an example, a TIFF viewer may be provided as an application with the wireless communication device to view the received facsimile document. Character and/or word recognition software may also be employed to convert the received facsimile image document to a text document suitable for word processing. Accordingly, the wireless communication device can be configured to send or receive any type of document in electronic form, such as text documents, image documents, and in any other type of document form available to the wireless communication device.

In accordance with an exemplary embodiment, the wireless communication device may be used in conjunction with enterprise facsimile server solutions. For example, a user may send a facsimile transmission to a selected facsimile destination, which may involve an intermediary fax server that can accept a digital input, such as may be in the form of a packet based transmission, and deliver the transmission to the intended destination using the appropriate translations or conversions. In another similar embodiment, an enterprise may employ a wireless network transfer station or node, such as an RF cell tower, that is connected to an enterprise LAN to permit a wireless communication device to directly provide a facsimile transmission to an enterprise fax server for transmission to the facsimile destination.

According to another exemplary embodiment of the disclosed system and method, a wireless communication device can be used as a point of origin for printing documents. For example, a document stored on a wireless communication device can be facsimile transmitted to a local facsimile device to obtain a local printout of the document. Local or remote print services that can print documents received by messaging such as email attachments or by facsimile transmission over a packet switched network or circuit switched network may also be used in conjunction with the disclosed system and method. For example, a user may receive a facsimile transmission on a wireless communication device, and forward the received document to a local facsimile destination in accordance with the disclosed system and method, or it can send the document as an email attachment to a local print service. In addition, the user may transmit the document to a LAN using a local WI-FI connection for local printing, emailing or other document communication.

In accordance with another exemplary embodiment, one or more of the imaging device or display for the disclosed system and method are separate from the wireless communication device used to send and receive facsimile transmissions. For example, the imaging device may be a separate camera or scanner that can be coupled to the wireless communication device for data transfer by any known or available data transfer technique, including a WI-FI network, direct connections such as via serial or parallel transmissions, email, flash memory storage, SD cards and any type of data transfer available to the wireless communication device.

In addition, a display used to view or help capture a document image may be separate from the wireless communication device. For example, a display may be provided as part of a device typically used for presenting data to one or more persons, such as a PC, a camera, a scanner/copier, a television, or any other type of device that presents visual data. The display may be part of a mobile system, including wireless systems, such as are available in automotive vehicles. The data presented on the display may be accessible by a wireless communication device in accordance with the present disclosure, such as via any of the data transfer implementations described above.

In accordance with one exemplary embodiment, a vehicle, such as an automotive vehicle, bus, train, boat or aircraft, for examples, has a communication network connection and display device that can be used to provide GPS maps, turn by turn directions, video and media streaming (internet radio, music, video, audio) and connectivity with other mobile devices, such as MP3 storage units or players. Mobile systems may be available to permit users to update their GPS with traffic/weather conditions, to download podcasts and act as a local network interface, such as, for example, a general purpose WI-FI or USB port for mobile devices on the vehicle, such as laptops, PDAs or mobile phones. A document image can be sent or received through the vehicle communication connection network, viewed on a vehicle display, and transmitted via a mobile phone capable of accessing the document image through a local vehicle connection.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for facsimile transmission of a document from a wireless communication device that includes a processor and memory for storing instructions that are accessible by the processor to implement the method, the method comprising:
provisioning the wireless communication device with a packet switched network realtime facsimile transmission protocol;
implementing a facsimile engine in the wireless communication device, the facsimile engine being operative to control a facsimile transmission involving the wireless communication device;
forming a connection between the wireless communication device and a packet switched communication network, the connection being suitable for transmitting data using the packet switched network realtime facsimile transmission protocol;
transmitting document information that is representative of the document from the wireless communication device to a specified destination address using the facsimile engine and the packet switched network realtime facsimile transmission protocol provisioned in the wireless communication device.

2. The method according to claim 1, further comprising:
providing the document information in the wireless communication device as a document image.

3. The method according to claim 2, further comprising:
capturing the document image with an image capture device.

4. The method according to claim 3, further comprising:
displaying at least a portion of the document image on a display of the wireless communication device.

5. The method according to claim 4, further comprising:
receiving an indication to capture the at least portion of the document image; and
capturing the at least portion of the document image in response to the indication.

6. The method according to claim 5, further comprising:
transmitting the document information in response to capturing the at least portion of the document image.

7. The method according to claim 5, further comprising:
receiving another indication subsequent to capturing the at least portion of the document image; and
transmitting the document information in response to the another indication.

8. The method according to claim 5, further comprising:
converting the at least portion of the document image to a transmission representation that forms at least a portion of the document information.

9. The method according to claim 8, wherein the transmission representation is a tagged image file format.

10. The method according to claim 5, wherein receiving the indication is in response to a user input.

11. The method according to claim 1, further comprising:
performing a conversion to produce the document information prior to transmitting the document information.

12. The method according to claim 1, wherein the realtime facsimile transmission protocol includes a T.38 protocol.

13. The method according to claim 1, further comprising:
receiving an indication for identifying the specified destination address.

14. The method according to claim 13, wherein receiving the indication identifies a destination address that represents an output device such that transmitting the document information signals the output device to output information that includes at least some of the document information.

15. A wireless facsimile device for facsimile transmission or reception of document information representing a document, the device comprising:
a wireless transceiver being operable to be communicatively coupled to a packet switched communication network to wirelessly transmit or receive the document information;
a memory storage for storing information including program instructions for implementing a facsimile engine that is operative to control a facsimile transmission in accordance with a packet switched network realtime facsimile transmission protocol; and
a processor communicatively coupled to the wireless transceiver and to the memory storage to permit access to and execution of at least some of the program instructions to implement the facsimile engine to control the wireless transceiver to transmit or receive the document information using the packet switched network realtime facsimile transmission protocol.

16. The device according to claim 15, further comprising:
an image capture device communicatively coupled to the processor for capturing an image of a document to obtain the document information.

17. The device according to claim 15, further comprising:
a user interface communicatively coupled to the processor to permit a user to supply input to the processor and receive output from the processor, the user interface including:
a display for presenting information to the user; and
an input device that permits the user to provide an input indication.

18. The device according to claim 15, wherein the realtime facsimile transmission protocol includes a T.38 protocol.

19. The device according to claim 16, wherein the processor is operable to execute at least some of the program instructions to convert the image of the document to a tagged image file format as part of the document information.

20. The device according to claim 15, wherein the processor is operable to execute at least some of the program instructions to control the wireless transceiver to transmit the document information to a specified destination address.

21. The device according to claim 20, wherein the specified destination address represents an output device such that transmission of the document information signals the output device to output information that includes at least some of the document information.

22. The device according to claim 17, wherein the processor is operable to execute at least some of the program instructions to:
identify a specified destination address based on the input indication; and
control the wireless transceiver to transmit the document information to the specified destination address.

23. A method for receiving a document with a wireless communication device from a transmitting device, the wireless communication device including a processor and memory for storing instructions that are accessible by the processor to implement the method, the method comprising:
provisioning the wireless communication device with a packet switched network realtime facsimile transmission protocol;
implementing a facsimile engine in the wireless communication device, the facsimile engine being operative to control a facsimile transmission involving the wireless communication device;
forming a connection between the wireless communication device and a packet switched communication network;

receiving, at the wireless communication device, a request for a facsimile transmission from the transmitting device to the wireless communication device; and receiving, at the wireless communication device, document information that is representative of the document using the facsimile engine and the packet switched network realtime facsimile transmission protocol provisioned in the wireless communication device.

24. A wireless communication device for mobile transmission or reception of document information, comprising:

a wireless transceiver being operable to be communicatively coupled to a packet switched communication network to transmit or receive the document information;

a memory storage for storing information including program instructions for implementing a facsimile engine that is operative to control a facsimile transmission in accordance with a packet switched network realtime facsimile transmission protocol; and a processor communicatively coupled to the wireless transceiver and to the memory storage to permit access to and execution of at least some of the program instructions to implement the facsimile engine to control the wireless transceiver to transmit or receive the document information using the packet switched network realtime facsimile transmission protocol.

* * * * *